No. 795,164. PATENTED JULY 18, 1905.
E. F. PECKHAM & W. J. HYDE.
DELIVERY TABLE FOR RULING MACHINES.
APPLICATION FILED APR. 12, 1904. RENEWED MAY 31, 1905.
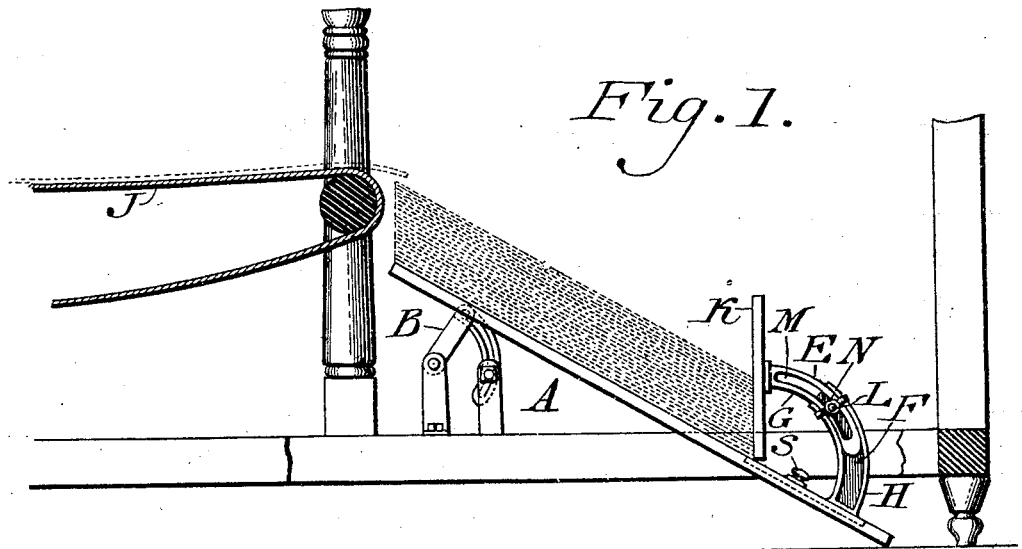
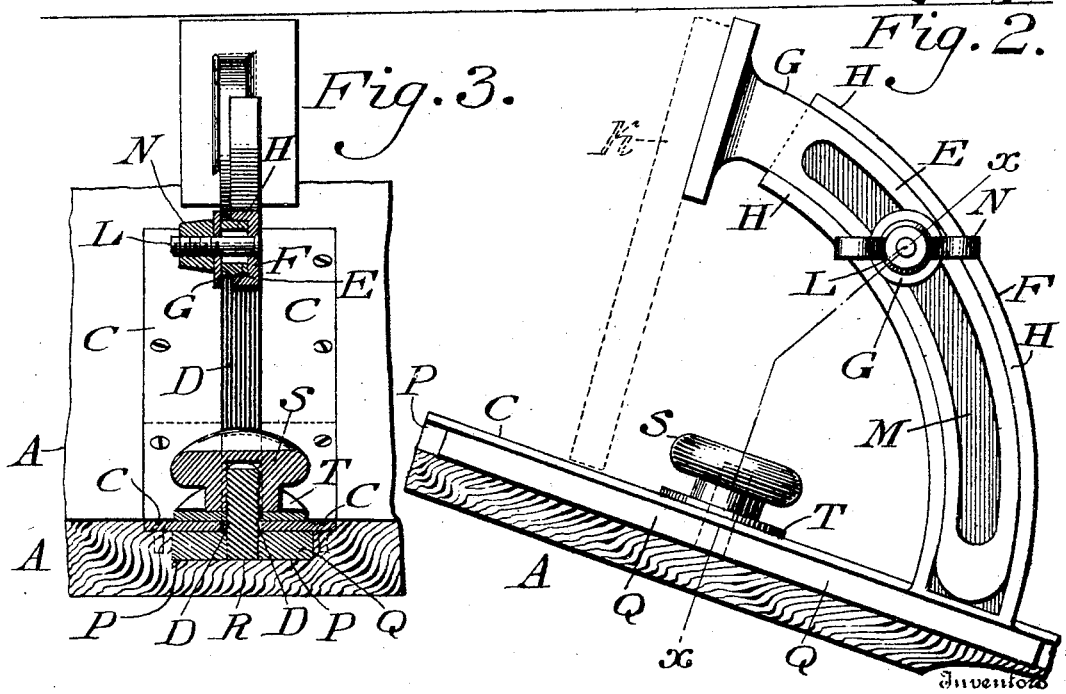

No. 795,164. Patented July 18, 1905.

UNITED STATES PATENT OFFICE.

EDWIN F. PECKHAM AND WILLIAM J. HYDE, OF PHILADELPHIA, PENNSYLVANIA, ASSIGNORS, BY MESNE ASSIGNMENTS, TO THE W. O. HICKOK MANUFACTURING COMPANY, A CORPORATION OF PENNSYLVANIA.

DELIVERY-TABLE FOR RULING-MACHINES.

SPECIFICATION forming part of Letters Patent No. 795,164, dated July 18, 1905.

Application filed April 12, 1904. Renewed May 31, 1905. Serial No. 263,155.

*To all whom it may concern:*

Be it known that we, EDWIN F. PECKHAM and WILLIAM J. HYDE, citizens of the United States, residing in the city and county of Philadelphia, State of Pennsylvania, have invented new and useful Improvements in Delivery-Tables for Ruling-Machines, of which the following is a specification.

Our invention relates to an improvement in a ruling-machine embodying a delivery-table with a board forming a stop and evener for the sheets acting in such a manner that the edges of said sheets next to the delivery-apron are laid so that the advancing sheet is directed over the top sheet of the pile without liability to drop between said pile and apron.

Figure 1 represents a partial side elevation and partial vertical section of a ruling-machine embodying our invention. Fig. 2 represents a similar view of a portion thereof on an enlarged scale, certain parts being in different positions from those shown in Fig. 1. Fig. 3 represents a transverse section on line *x x*, Fig. 2.

Similar letters of reference indicate corresponding parts in the figures.

Referring to the drawings, A designates the delivery-table of a ruling-machine, which occupies an inclined position and is adapted to have its inclination adjusted by means of the links B usual in such cases. Secured to the upper side of said table are the plates C C, which extend in the direction of the length of said table and are separated, leaving between them the slot or passage D.

E designates an arm formed of the segmental members F and G, the member F having side flanges H and receiving the member G, whereby the latter may be moved in and out on said member F, and thus lengthen or shorten the said arm E.

Connected with the end of the member G toward the delivery-apron J is the board K, the same being shown in full lines in Fig. 1 and dotted lines in Fig. 2 and removed from Fig. 3, it being noticed that by proper manipulation of said member G said board K may be placed in truly vertical position, as shown in Fig. 1, which being accomplished the board is caused to maintain said position by means of the screw L, which is passed through an opening in the member F and a segmental slot M in the member G and engaged by the nut N, which when properly rotated tightens the members F and G and clamps the same one on the other.

In the upper side of the table A below the plates C is the groove or recess P, which is freely occupied by the sliding bar Q, said bar having secured to it the vertically-arranged screw R, which passes freely through the slot or passage D and has its upper end engaged by the nut S, between which and the plates C C is the washer T, it being evident that by properly rotating said nut the bar Q may be clamped to said plates C.

It will be noticed that the member F of the arm E rises from the bar Q through the passage D and is secured to said bar, whereby the arm E may move with said bar, and when the nut S is properly tightened said arm may be held firmly in the position to which it is adjusted, it being also evident that when the nut S is unscrewed or loosened the arm E may be shifted in the direction to and from the delivery-apron J and when the board K is properly set relatively to the size of the ruled or other sheets placed upon the table A the nut is tightened and said arm may be held immovable, and so retain its adjusted position.

As heretofore stated, the board K is retained in upright or perpendicular position, while the table A occupies an inclined position. Consequently as the sheets leave the apron J and are piled one on the other they drop against said board, which stops their motion and causes the adjacent edges of the piled sheets to be even or uniform, the ends of the sheet opposite to said board K forming a truly perpendicular line, thus avoiding the existence of a large gap between said pile and the adjacent apron, while the upper corner of the pile is salient, whereby as a sheet is fed by the apron J to the pile said sheet is directed over the upper corner of the pile, (see dotted line, Fig. 1,) and so lodges on the top sheet of the pile, assuming its proper place without having been liable to drop into the gap between the pile and delivery-apron. It is also evident that owing to the arm E and its movable connection with the table A the board K, which is disconnected from the table A, may be moved forward and backward relatively to the length of the sheets to be piled, while its vertical position may be preserved.

In Fig. 2 the board is shown as entirely thrown back to its primary position, from which it may be adjusted to the operative position shown in Fig. 1.

In the use of the word "board" it is not to be understood that the same is necessarily formed of wood, as any suitable material may be employed for the same.

Various changes may be made in the details of construction shown without departing from the general spirit of our invention, and we do not, therefore, desire to be limited in each case to the same.

Having thus described our invention, what we claim as new, and desire to be secured by Letters Patent, is—

1. In a ruling-machine, a delivery-table, a vertically-arranged board disconnected therefrom and a support for said board, consisting of an arm formed of segmental members fitted to each other and means for tightening said members, said board being adapted to place a pile of sheets inclined on said table with the rear edges thereof in uniform vertical direction.

2. In a ruling-machine, an inclined delivery-table, a board on said table and means for adjusting said board in vertical direction, said board being disconnected from said table and sustained thereover by an arm formed of segmental members fitted to each other and means for tightening said members.

3. In a ruling-machine, an inclined delivery-table, a longitudinally-extending passage in said table, a sliding bar in the table below said passage, a screw connected with said bar and projecting through said passage, a tightening-nut on said screw, an arm formed of segmental members, one member being adjustable on the other member in circular direction and the latter-named member rising from and being secured to said bar and movable in said passage and a board connected with the movable segmental member of said arm and disconnected from said table.

4. In combination with an angular delivery-table having a longitudinal slot therein, a bar adjustable in said slot, a board above said table, an arm formed of segmental members respectively on said bar and board, and means for clamping said members, said board being disconnected from said table, whereby it may be maintained in vertical position without regard to the angle of inclination of said table.

EDWIN F. PECKHAM.
WILLIAM J. HYDE.

Witnesses:
JOHN A. WIEDERSHEIM,
WM. CANER WIEDERSEIM.